Oct. 7, 1924.
W. LE GENDRE
1,510,498
FRICTION CLUTCH
Filed June 26, 1923     2 Sheets-Sheet 2
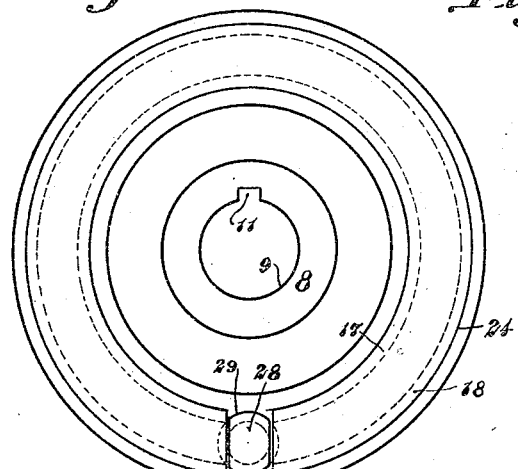
Fig. 4.
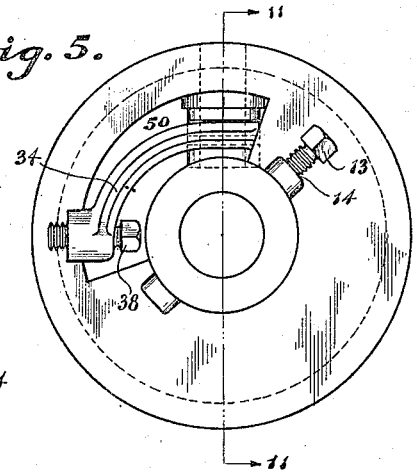
Fig. 5.
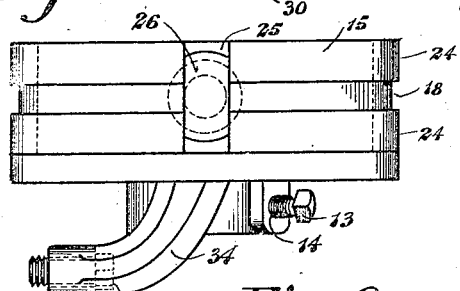
Fig. 6.
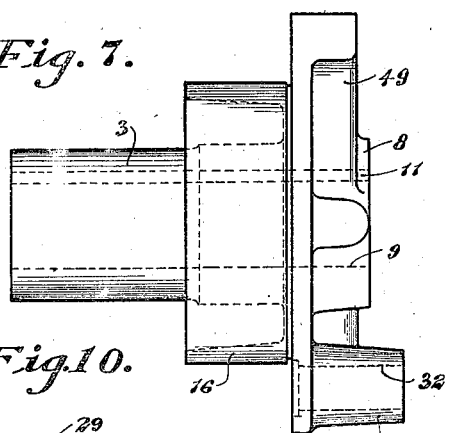
Fig. 7.
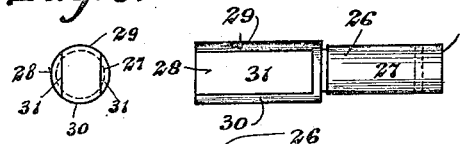
Fig. 8.   Fig. 9.   Fig. 10.
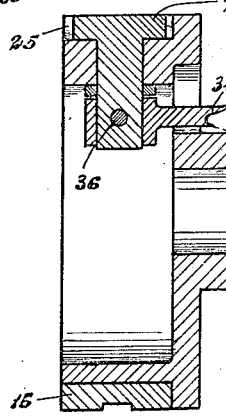
Fig. 11.
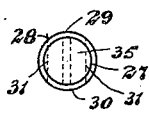
INVENTOR
WILLIAM LE GENDRE
By James N. Ramsey
ATTORNEY Patented Oct. 7, 1924.

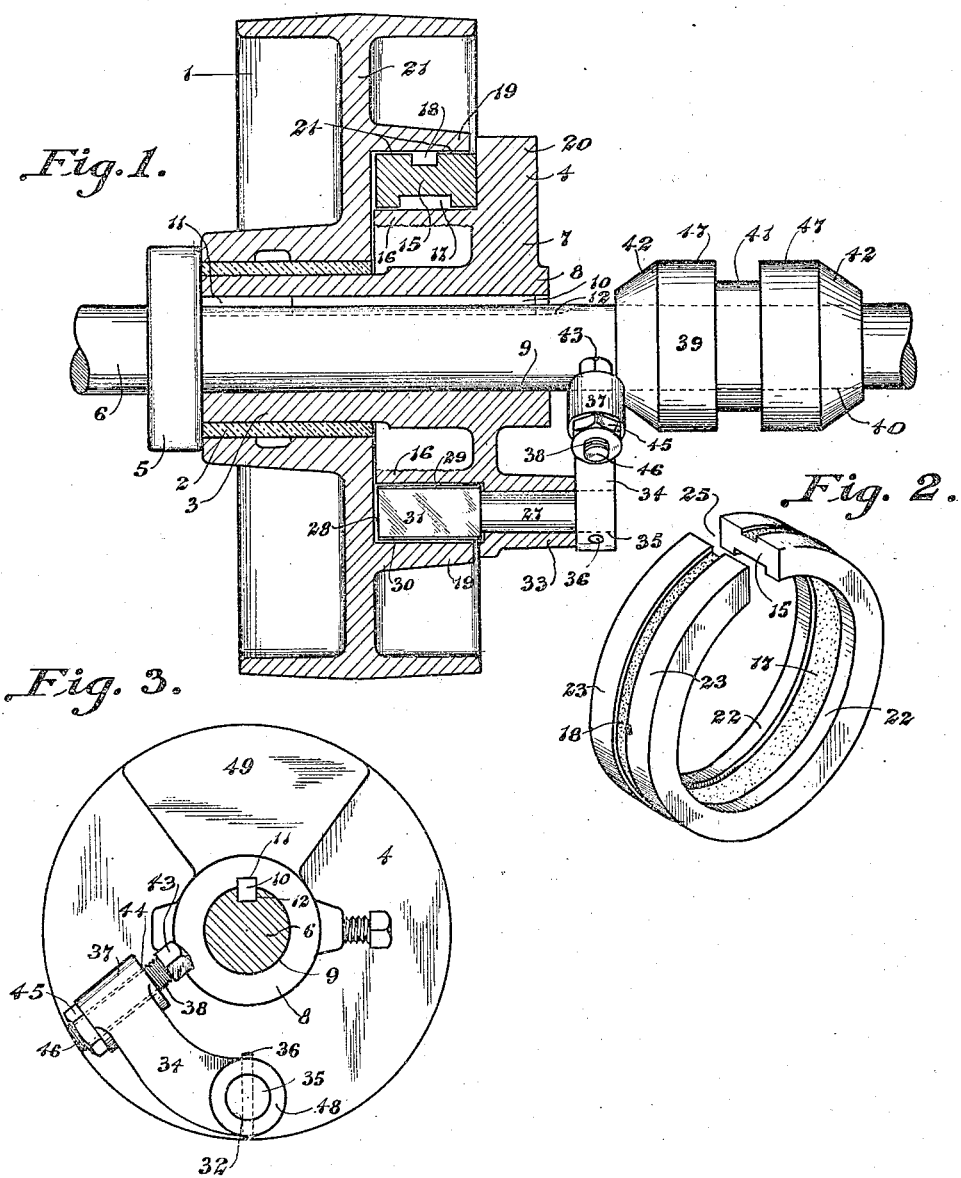

1,510,498

UNITED STATES PATENT OFFICE.

WILLIAM LE GENDRE, OF CINCINNATI, OHIO.

FRICTION CLUTCH.

Application filed June 26, 1923. Serial No. 647,816.

*To all whom it may concern:*

Be it known that I, WILLIAM LE GENDRE, a citizen of the United States, residing at Cincinnati, in the county of Hamilton and State of Ohio, have invented certain new and useful Improvements in Friction Clutches, of which the following is a specification.

My invention relates to friction clutches operative by the use of an expansible ring. Heretofore it has been the practice to employ split expansible rings machined on all surfaces or on all surfaces except in grooves transversely of the ring. It is well known that the scale on the exterior of certain metals, such as cast iron, steel and semi-steel in their rough cast form possesses greater resilient and flexible properties than is possessed by the metal beneath this scale. The machining operation removes the scale from the exterior of the metal, thereby lessening the resilient and flexible properties and lowering the elastic limit of the metal.

The loss of resiliency in the expansible ring causes the clutch to continue to grip after the expanding element has been released, thus continuing to drive the machine, and because of this inability to perform its proper function, the old expansion ring must be replaced by a new one or the old one must be removed from the clutch and repaired at considerable expense.

Also where the scale remains in transverse grooves of the expansion ring having other transverse portions machined, only certain portions of the complete circumference of the ring retain the original resiliency, because the metal between the transverse grooves is relieved of resilience by the removal of the scale.

An object of my invention is to provide a clutch in which the expansible ring is constructed so that sufficient scale remains about its complete circumference to retain a high elastic limit in the metal of the ring so that it will not lose its resiliency and will, therefore, continue to perform its proper functions for an indefinite time.

Another object of my invention is to provide a clutch extremely strong and durable in construction, yet simple and certain in operation, and having adjusting mechanism that permits continued use of the device without expending valuable time while making adjustments.

My invention consists in the mechanism and details of construction hereinafter described, claimed and illustrated in the drawings in which:

Fig. 1 is a longitudinal vertical section of my invention;

Fig. 2 is a perspective view of my improved expansible ring;

Fig. 3 is a right end elevation showing the shaft in section;

Fig. 4 is a left end elevation showing the grooves in the expansible ring and one end of the spreading member in dotted lines;

Fig. 5 is a right end elevation showing the expanding elements in modified form;

Fig. 6 is a plan view showing the expanding elements in modified form;

Fig. 7 is a side elevation showing the housing having the expanding elements removed;

Fig. 8 is an inner end view of the spreading member;

Fig. 9 is a side elevation of the spreading member;

Fig. 10 is an outer end view of the spreading member; and

Fig. 11 is a longitudinal vertical section taken on a plane corresponding to the line 11—11 of Fig. 5.

In my preferred form of construction, loose pulley 1 has a bearing 2 about extending end 3 of driven member 4. A collar 5 secured to shaft 6 prevents endwise movement of the loose pulley. The pulley is hereinafter referred to as the driving member. The driven member 4 comprises web 7 and hub 8 having an extending end 3. Shaft 6 passes through bore 9 in hub 8. The driven member is secured to shaft 6 as by key 10 seated in key seat 11 of hub 8 and coacting with key-way 12 in the shaft. The driven member 4 is held securely against endwise movement as by set screw 13 received in threaded hole 14 of the hub. Resilient friction ring 15 having respectively, inner and outer grooves 17 and 18 is received about hollow hub 16 integrally formed with web 7. The friction ring has inner friction contact and outer friction contact, respectively, with hollow hub 16 and web 19 of driving member 1. Friction ring 15 is held against endwise movement as by circular flange 20 formed on the driven member and web 21 of driving member 1. The friction ring 15 is so formed that the scale on the exterior surface in grooves 17 and 18 of the friction ring is around the complete inner and outer circumference of the ring. The scale formed in grooves 17 and 18, respectively, is not disturbed as by machining inner and outer surface 22 and 23 of the ring. Sufficient scale as is formed on the rough casting is retained in grooves 17 and 18 to insure sufficiently high elastic limit in the metal of the ring. The surface 22 of friction ring 15 fits snugly around hollow hub 16 when in contracted relation but when expanded outer surface 23 contacts with and grips the inner surface of web 19 at 24.

To permit expansion under pressure the friction ring is split by slot 25. For expanding the ring, I provide a spreading member 26 having one end 27 cylindrical in form and the other end 28 having rounded top 29, rounded bottom 30 and flat sides 31 adapted to contact the outer surface formed on the walls of slot 25. The spreading member 26 is received in hole 32 in projection 33 of driven member 4 and has rotary movement imparted by rocker arm 34 having one end fixed to protruding end 35 by pin 36. The other end of rocker arm 34 comprises boss 37 internally threaded to receive bolt 38. Means are provided for imparting movement to rocker arm 34 comprising an endwise slidable hub 39 having bore 40 therethrough and mounted on shaft 6 adjacent the driven member. A usual fork secured to a usual shifting rod is received in circular groove 41 of the hub for sliding the hub endwise on shaft 6. An inclined surface 42 is provided on hub 39 for coacting with rounded bolt head 43 of externally threaded bolt 38 received in internally threaded hole at 44 through boss 37 integral with rock arm 34. The extent of movement imparted to rocker arm 34 as by contact of inclined surface 42 of hub 39 with rounded bolt head 43 may be regulated as by inwardly or outwardly adjusting of bolt 38 locked in position by threaded nut 45 received on externally threaded end 46 of bolt 38.

In operation the mechanism of my device is as follows:

The usual shifting rod and fork (not shown in illustration) coact with groove 41 of hub 39 contracting inclined surface 42 of the hub with rounded head 43 of bolt 38 and riding rounded head 43 of the bolt upon surface 47 of the hub thereby forcing rocker arm 34 outwardly through coacting of bolt 38 with boss 37 integral with the outer end of the rocker arm. Rotary movement as having an axis transversely of driven member 4 is imparted to spreading member 26 as by the other end 48 of rocker arm through pin 36 combinedly received as by end 48 of the rocker arm and end 35 of the spreading member. The round end 27 of the spreading member rotates in bore 32 of projection 33 of the driven member 4 imparting rotary movement to its other end thereby expanding friction ring 15 as by contact of rounded top 29 and rounded bottom 30 with the outer surfaces of the friction ring formed by slot 25. The construction of the end 28 of spreading member 26 is such that the measurement from rounded top 29 to rounded bottom 30 is greater than the measurement from flat side 31 to flat side 31 causing a leverage against the outer surfaces of the friction ring within slot 25 when rotary movement is imparted to the spreading member. The driving member 1 rotates on bearing 2 carried on an extension 3 of driven member 4 as shown in Fig. 1.

Expansion of friction ring 15 causes driving member 1 to grip machined outer surface 23 of the friction ring, thereby causing driven member 4 to rotate combinedly with the driving member by one end 27 of spreading member 26 being received in hole 32 of projection 33 of driven member 4 and the other end 28 of the spreading member positioned in slot 25 of friction ring 15, thereby securing the friction ring.

Key 10 coacts with driven member 4 and shaft 6 thereby imparting rotary movement to the shaft upon which may be mounted the usual pulleys for transmitting power. Actuation of the usual shifting rod and fork (not shown) coacting with groove 41 imparts endwise movement to hub 39 permitting the rounded bolt head 43 to disengage contact with surfaces 42 and 47 of the hub whereby through mechanism bolt 38, rocker arm 34, pin 36 and expanding member 26, friction ring 15 is permitted to contract whereupon the outer surfaces 23 of the friction ring release gripping contact of inner surface 24 of web 19 of driving member 1, thereby permitting the driven member and shaft 6 to stop rotating. For the purpose of insuring smooth running of the mechanism I provide metal enlargement 49 opposite or reduced metal section 50 adjacent rocker arm 34, bolt 38 and driven member extension 33 for counterbalancing the driven member.

It is to be understood that it is not intended to confine the invention to the one form of embodiment herein disclosed because it is susceptible of embodiments of various forms, and I show a modification of my invention in Figs. 5, 6 and 11 in which rocker arm 34 is curved outwardly and upwardly having its inner end connected to spreading member 26 which extends from slot 25 of friction ring 15 toward the center of driven member 4. Rounded bolt head 43 when contacted with and forced outwardly by inclined surface 42 through bolt 38 and rocker arm 32 imparts rotary movement to spreading member 26 as having an axis extending from the top of the driven member toward its center, thereby expanding friction ring 15 as by contact of the outer ends of the spreading member with the outer surface of the friction ring formed by slot 25. In Figs. 6 and 11 I show a modification of my invention which is adapted to be fixed to shaft 6 and adjacent a suitable driving member rotatably mounted on the shaft and having inner surface 24 of web 19 (as shown in Fig. 1) adapted to be engaged by friction ring 15.

What I claim as new and desire to secure by Letters Patent is:

1. In a friction clutch, a shaft, a driven member secured to said shaft, a driving member journaled on the hub of said driven member, a friction surface on said driving member, a split friction ring received between said driving member and said driven member, machined surfaces on said ring, non-machined surfaces on said ring in a circumferential groove and means for spreading said ring into contact with said driving member.

2. In a friction clutch, a shaft, a driven member secured to said shaft, a driving member journaled on the hub of said driven member, a friction surface on said driving member, a split friction ring received between said driving member and said driven member, machined surfaces on said ring, a non-machined surface on said ring in an outer circumferential groove and means for spreading said ring into contact with said driving member.

3. In a friction clutch, a shaft, a driven member secured to said shaft, a driving member journaled on the hub of said driven member, a friction surface on said driving member, a split friction ring received between said driving member and said driven member, machined surfaces on said ring, non-machined surfaces on said ring in an outer and in an inner circumferential groove and means for spreading said ring into contact with said driving member.

4. In a friction clutch, a friction ring, said friction ring being severed at a point on its circumference by a slot, machined friction pads on the outside of said ring, a non-machined circumferential rough groove between said friction pads on the outer surface of said ring and a non-machined rough surface in an inner circumferential groove between pads on the inner surface of said ring whereby natural resiliency is retained.

5. In a friction clutch, a shaft, a driven member secured to said shaft against rotary movement, a driving member adapted to rotate independent of said driven member, a friction ring received between said driven member and said driving member, said friction ring having a circumferential groove of non-machined surface, a slot in said friction ring, a spreading member in said slot, said spreading member extending transversely of said driven member, and means for actuating said spreading member for spreading said friction ring.

6. In a friction clutch, a friction ring, said friction ring being severed at a point on its circumference by a slot, machined friction pads on the outside of said ring, and a non-machined rough circumferential groove between said pads whereby natural resiliency is retained.

7. In a friction clutch, a friction ring, said friction ring being severed at a point on its circumference by a slot, machined friction pads on the inner surface of said ring and a non-machined rough circumferential groove on the inner surface of said ring whereby natural resiliency is retained.

8. In a friction clutch, a driven member secured to a shaft, a driving member journaled on said driven member, said driven member comprising a hub, a web on said hub, a hollow hub on said web, a friction ring received about said hollow hub, said ring severed at one point by a slot, non-machined surfaces on said ring whereby it is caused to resiliently close about said hollow hub, circumferential machined surfaces on said ring to form contact with said hollow hub, a non-machined surface in a circumferential groove, a spreading member having rotary movement in an extension of said driven member comprising a pin cylindrical on one end having its other end so formed and adapted to coact with surfaces on said ring formed by said slot, a bearing for said cylindrical portion of said spreading member in said extension of said driven member and means for causing rotary movement of said spreading member.

9. In a friction clutch, a shaft, a driven member secured to said shaft against rotary movement, a driving member adapted to rotate independently of said driven member, a friction ring received between said driven member and said driving member, said friction ring having an outer circumferential groove of non-machined surface, a slot in said friction ring, a spreading member in said slot and means for actuating said spreading member for spreading said friction ring into contact with said driving member.

10. In a friction clutch, a shaft, a driven member secured to said shaft against rotary movement, a driving member adapted to rotate independent of said driven member, a friction ring received between said driven member and said driving member, said friction ring having an inner and an outer circumferential groove of non-machined surface, a slot in said friction ring, a spreading member in said slot, and means for actuating said spreading member for spreading said friction ring into contact with said driving member.

11. In a friction clutch, a shaft, a driven member, a driving member secured to said shaft adapted to rotate independently of said driven member, a split friction ring received between said driven member and said driving member, said friction ring having an inner and an outer circumferential groove of non-machined surface, said friction ring having machined circumferential friction pads, and a spreading member adapted to spread said friction ring into contact with said driving member for rotating said shaft.

12. In a friction clutch of the class described, a split friction ring having a non-machined circumferential groove.

WILLIAM LE GENDRE.